United States Patent

Bussey, Jr. et al.

[11] 3,957,414
[45] May 18, 1976

[54] APPARATUS FOR EMBOSSED FILM MANUFACTURE

[75] Inventors: Francis H. Bussey, Jr., Rosedale; James K. Rutherfoord, Terre Haute, both of Ind.

[73] Assignee: Ethyl Corporation, Richmond, Va.

[22] Filed: Oct. 11, 1974

[21] Appl. No.: 514,240

[52] U.S. Cl. ............................ 425/384; 425/388; 425/DIG. 60
[51] Int. Cl.² ........................................ B29C 7/22
[58] Field of Search ............... 425/326 R, 363, 388, 425/DIG. 60, 384

[56]     References Cited
       UNITED STATES PATENTS

| | | | |
|---|---|---|---|
| 2,511,703 | 6/1950 | Ettl | 425/384 X |
| 2,752,632 | 7/1956 | Winstead | 425/363 |
| 3,072,961 | 1/1963 | Gilbert | 425/388 |
| 3,286,305 | 11/1966 | Seckel | 425/326 |
| 3,465,384 | 9/1969 | Barchi et al. | 425/363 X |
| 3,471,600 | 10/1969 | Meek | 425/384 X |
| 3,594,863 | 7/1971 | Erb | 425/363 X |
| 3,594,865 | 7/1971 | Erb | 425/363 X |
| 3,685,930 | 8/1972 | Davis et al. | 425/363 X |
| R23,910 | 12/1954 | Smith et al. | 425/388 X |

*Primary Examiner*—Ronald J. Shore
*Attorney, Agent, or Firm*—Donald L. Johnson; John F. Sieberth; David L. Ray

[57]     ABSTRACT

A method and apparatus for vacuum embossing sheet thermoplastic material which utilizes an endless, seamless structure as the embossing surface. A sheet of heat-softened thermoplastic film is passed over an embossing screen, the embossing screen being supported by two support rolls, a drive roll and two seal rolls. A vacuum is applied to the screen between the seal rolls to pull the film into contact with the screen thereby producing an embossed pattern on the film corresponding to the outer surface of the screen. After the film is removed from the endless, seamless screen the film is cooled to set the pattern in the film. The process produces an embossed film which has high strength, low surface gloss or light reflectance, and a deep embossed pattern.

7 Claims, 7 Drawing Figures

APPARATUS FOR EMBOSSED FILM MANUFACTURE

CROSS-REFERENCE TO RELATED APPLICATION

This co-pending application has subject matter related to application Ser. No. 463,681, filed Apr. 24, 1974, said application being located in Group 147, said application being commonly owned with the present application.

BACKGROUND OF THE INVENTION

The present invention relates to a process and apparatus for producing embossed thermoplastic sheet material utilizing a vacuum embossing method and apparatus with an endless, seamless screen as the embossing surface, the screen being supported by two support rolls, a drive roll, and two seal rolls.

Embossed plastic film or sheet material has come into widespread use in many fields. One particularly large scale use of embossed thermoplastic sheet material is that of disposable articles such as hospital pads and drapes, wearing apparel and disposable diapers. Embossed film is also finding increased use in the packaging field, for example, as bags and overwraps for articles such as clothing and for shopping bags. In order to fulfill the requirements established by the end use of embossed film, it is desirable that the film have suitable properties for handling by fabricating machines, particularly those used for the manufacture of disposable articles, e.g., disposable diapers, sheets, pillow cases, drapes, raincoats, etc. In many cases it is important that the embossed thermoplastic film be soft and flexible and have the proper pattern and embossed depth in order to provide the desired "hand" or clothlike feel for the thermoplastic embossed material. Additionally, for many uses it is desired that the embossed thermoplastic material have as low a surface gloss as possible in order to simulate woven clothlike fabrics. Further, embossed thermoplastic materials must meet minimum physical specifications which are necessary in order that the films be handled in high speed, automatic fabricating machines, i.e., they should have suitable modulus, tensile strength, and impact strength.

Heretofore, embossed thermoplastic films such as polyethylene, polypropylene, polybutene-1, polyvinyl chloride and other flexible thermoplastic thin films have been made by various methods. One method is to extrude the thermoplastic film from a conventional slot die onto a continuously moving, smooth, cool, casting surface, e.g., a chill roll. The engraved pattern may be applied to the chill roll and the film pressed to the roll while in the amorphous or molten stage by press rolls. Alternatively, the chill roll may be smooth and the desired pattern in the film may be pressed into the film on the chill roll by means of an engraved and machined embossing roll which is pressed against the film and the chill roll to impress the pattern into the film as it is cooled on the chill roll.

Another technique used is to produce engraved rollers and to provide a heated, moving strip of film for engagement by the nip of the rollers, one of which carries the embossing pattern.

Embossed film has been prepared to a very limited extent by the use of vacuum embossing processes. Heretofore, it has been difficult to economically produce vacuum embossed film which has the characteristics and properties of film produced by the more conventional high pressure embossing processes. In one process for producing vacuum embossed film an endless belt made of a wire mesh which is butt welded to produce the endless belt is utilized. One embodiment is carried over a vacuum box, and heated film is applied thereto to impress the pattern of the screen on the heated film. In another embodiment the endless, butt welded screen is mounted on a cylindrical drum having a foraminous surface, and vacuum is applied to the hollow drum to pull the heated film into contact with the wire screen. However the belts have a welded joint mark which marks the embossed film once during each revolution of the belt. Thus, the film is suitable only for use in limited applications wherein the pattern can be cut into sections and used to avoid the joint mark produced by brazing or welding the ends of the metal screen together.

Other processes used in vacuum embossing film utilize perforated vacuum embossing cylinders which carry an outer layer of a porous substance, such as metallic mesh, fiberglass, embossed paper, or woven fabric materials, as the outer embossing surface thereon. The perforated cylinders carry on their outer surface the sized sleeve which is either butt jointed and/or lap jointed and thus produces a transverse mark on the thermoplastic embossed film as it is carried over the joint in the sleeve covering. It has been suggested to reweave the fabric together; however, it has been found that this is an extremely tedious and expensive operation and cannot be commercially accomplished to produce a wide variety of rolls from fabric materials.

From the foregoing, it can be seen that the previously utilized processes and apparatuses for vacuum embossing film suffer from numerous disadvantages which either increase the cost of vacuum embossed film and/or produce vacuum embossed film which does not have properties equivalent to that of film embossed by the pressure embossing method. Previously used processes and apparatuses for vacuum embossing film have suffered from the inability to produce long, continuous lengths of vacuum embossed film without having transverse marks across the film at periodic intervals equal to the length of the embossing belt and/or the circumference of the screens which are used to cover the embossing cylinder.

Additionally, many of the processes and apparatuses used heretofore for vacuum embossing film do not produce clear, distinct, sharp patterns having the desired "hand" or feel which is comparable to pressure embossed film. Further, many of the films produced by vacuum embossing have been found to be very deficient in physical properties to equivalent embossed films, i.e., they have a low modulus, low tear strength, poor impact strength and nonuniform roll contours when rolled into large size rolls for shipment.

SUMMARY OF THE INVENTION

It is an object of the present invention to provide a process and apparatus for producing vacuum embossed thermoplastic film.

It is a further object of the present invention to provide a process and apparatus for producing vacuum embossed thermoplastic film having enhanced physical properties.

It is a still further object of the present invention to provide an economical and efficient apparatus for producing said film.

The process of the present invention for vacuum embossing thermoplastic film may be carried out by continuously advancing a length of the film that is heated at least to its softening temperature and applying the heated film to a portion of the surface of an endless, seamless, perforated screen or belt supported on a plurality of rotatable rolls. The perforated screen or belt is advanced at the same rate as the heated film. A vacuum is applied to at least a part of the undersurface of the perforated screen or belt to pull the heated film into contact with the top surface of the screen or belt to cause the film to assume the shape of the pattern provided on the top surface of the screen or belt. Heat is removed from the embossed film at a rate sufficient to maintain the embossed film at a temperature sufficiently low enough to cause the embossed film to substantially retain the pattern when removed from the belt or screen. The film is continuously removed from the screen or belt.

The apparatus of the present invention for vacuum embossing sheet material includes a pair of spaced apart support rolls, a drive roll positioned intermediate and to one side of the pair of support rolls, a support structure for mounting the pair of support rolls and the drive roll for rotation, an endless, seamless, flexible, porous screen mounted on the pair of support rolls and the drive roll for rotation therewith, and a vacuum assembly positioned between the pair of support rolls and engaging a portion of the underside of the screen that extends between the pair of support rolls.

The product aspects of the present invention are realized in a vacuum embossed thermoplastic film having the following physical properties:

| | | |
|---|---|---|
| Tensile Strength | | |
| Machine Direction | 3,000 | psi |
| Transverse Direction | 1,600 | psi |
| Elongation | | |
| Machine Direction | 275 | percent |
| Transverse Direction | 400 | percent |
| Modulus at 1% | | |
| Machine Direction | 15,000 | psi |
| Transverse Direction | 12,000 | psi |
| Impact (26 in Dart Drop) | 90 | grams |
| Stress at 25% | 600 | grams |
| Coefficient of Friction | 1.0 | |
| Gloss at 45 degrees | 9 | |
| Embossed Thickness | 3.5 | mils |
| Unembossed Thickness | 0.9 | mil |
| Density | 0.96 | g/cc |

DESCRIPTION OF THE PREFERRED EMBODIMENTS

Figure 1:
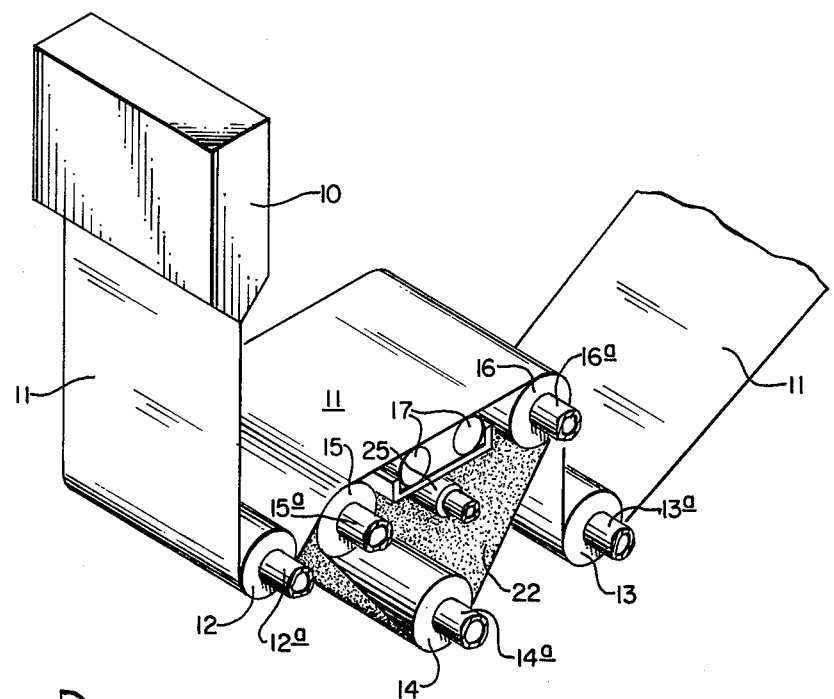
FIG. 1 is a perspective, schematic view of one embodiment of an apparatus of the present invention suitable for carrying out the process of the present invention.

Referring now to FIG. 1, there is shown a schematic view of an apparatus of the present invention suitable for carrying out the process of the present invention which includes a conventional slot die 10. It will be understood that slot die 10 is fed a plasticized melt of a suitable polymer for forming a film (e.g., polyethylene, polypropylene, polyvinyl chloride) and extrudes a sheet of film 11 in a downward direction. The sheet of film 11, while still hot from extrusion, is applied to the top surface of an endless, seamless, flexible, porous screen 22 by means of a heated lay-on or lag roller 12. Screen 22 is mounted on drive roller 14 and on support rollers 15 and 16. Spaced apart cylindrical seal rolls 17—17 make rolling contact with the underside of screen 22. A vacuum is applied by manifold 25 to the area lying between support rolls 17—17 and seal roll support member 18 to pull the film 11 down onto screen 22 to emboss the film. After the film leaves screen 22 it next passes over chill roller 13 which is temperature-controlled to cool the film, and from there it passes on to any suitable wind-up apparatus (not shown) or the like for storing the film. Rolls 12, 13, 14, 15 and 16 are hollow inside and have hollow shafts 12a, 13a, 14a, 15a, and 16a, respectively, at each end thereof for circulating heating or cooling fluid therethrough.

Figure 2:
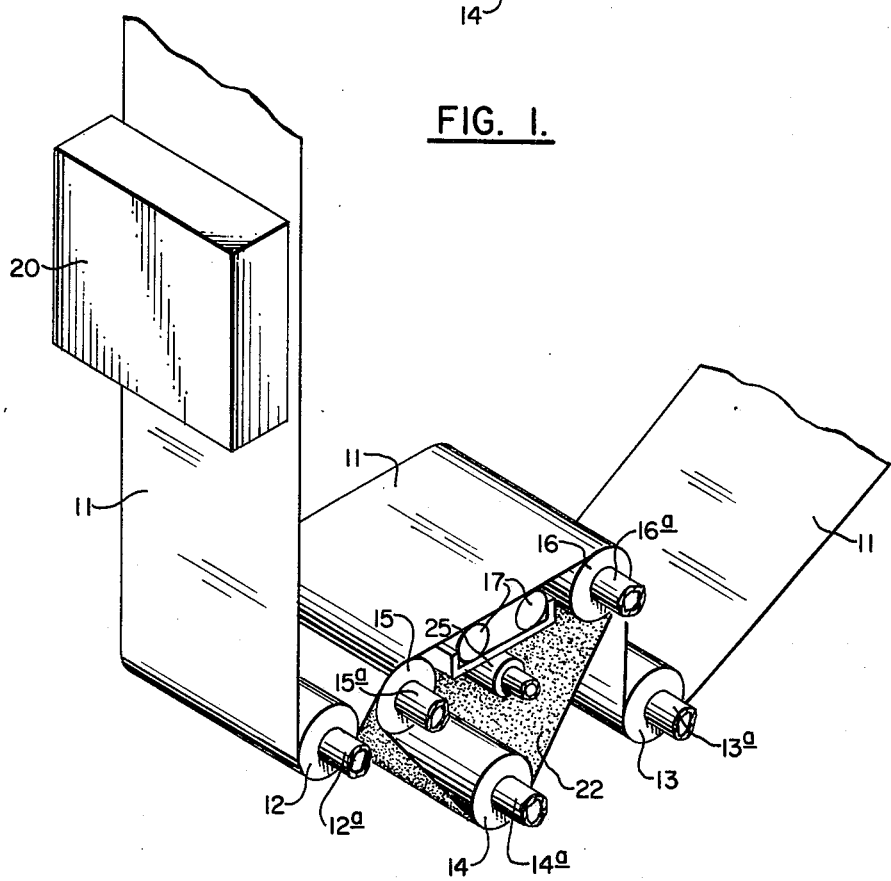
FIG. 2 is a perspective, schematic view of a second embodiment of an apparatus of the present invention suitable for carrying out the process of the present invention.

Referring now to FIG. 2, there is shown a second embodiment of an apparatus of the present invention for carrying out the process of the present invention. The apparatus shown in FIG. 2 is substantially the same as that described hereinbefore in connection with FIG. 1 and the same reference numerals are used to identify the same components. In this embodiment, the film is a preformed film which is passed downward in close proximity to heater 20 which raises the temperature of the thermoplastic film 11 to a softened state for embossing. In the embodiment shown in FIG. 2, heater 20 may be an electrical resistance heater which is used to heat the film. It is understood that any other suitable means may be used for heating the film, e.g., infrared lamps, hot air, passing the film over heated rollers, or in contact with other suitable heated surfaces. The heated film is then received in the same apparatus as described hereinbefore in FIG. 1 to produce an embossed pattern thereon.

Figure 3:
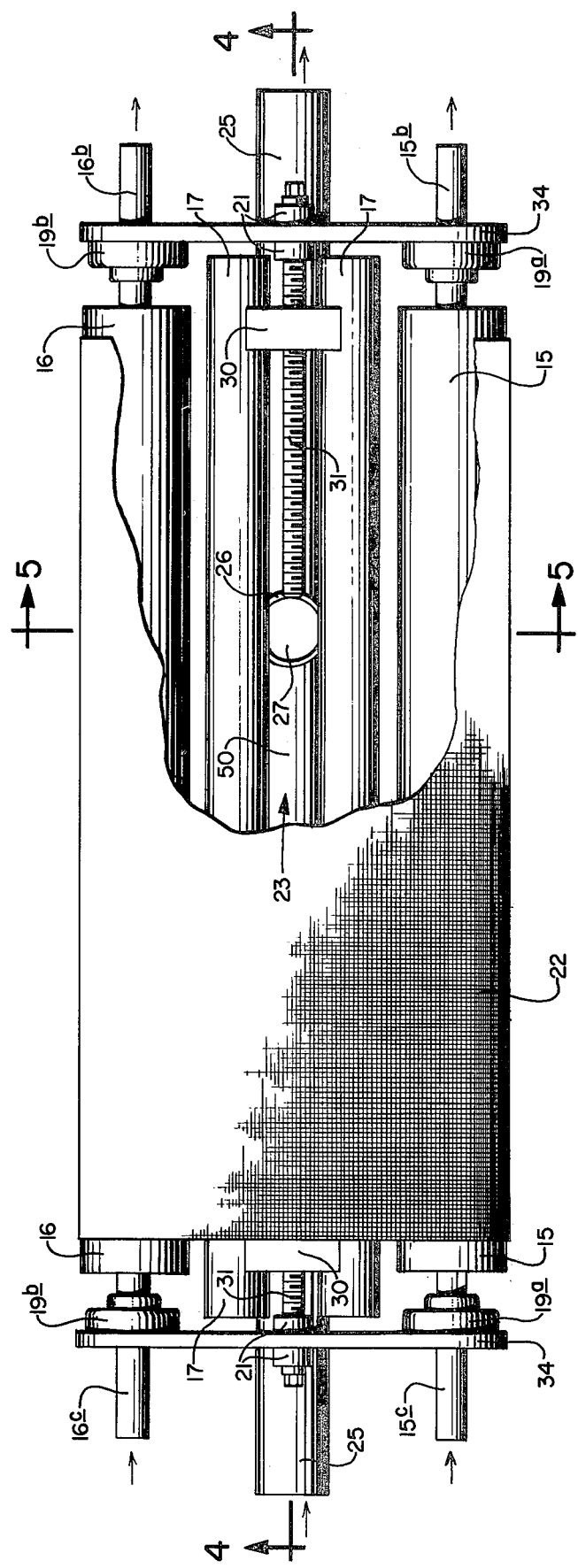
FIG. 3 is a top plan view of a portion of a preferred embodiment of the apparatus of the present invention with a portion of the endless, seamless screen being cut away.
Figure 4:
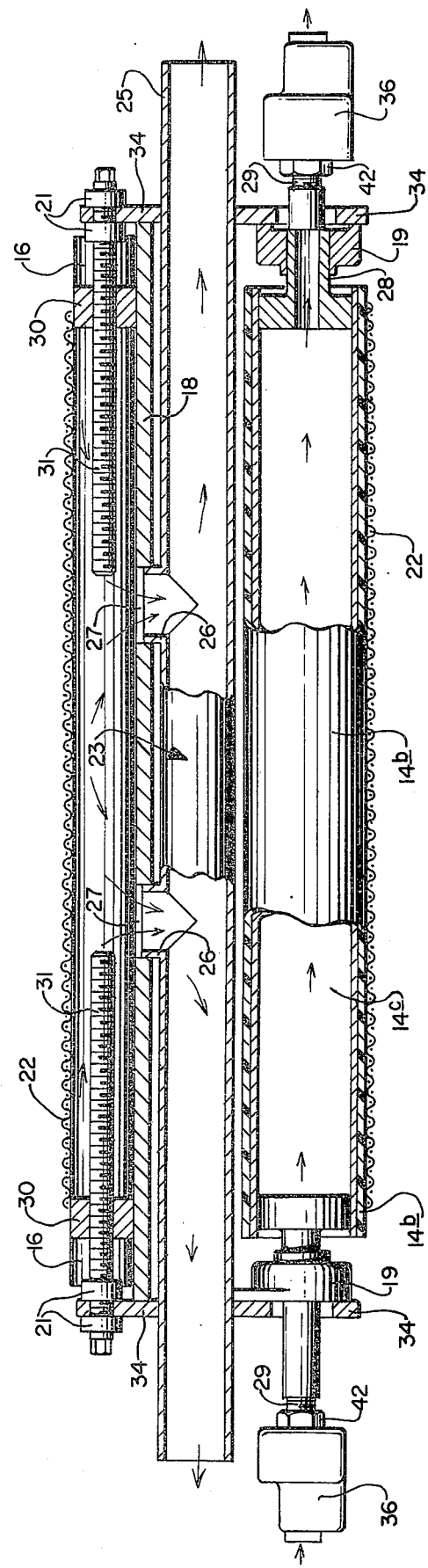
FIG. 4 is a partial elevational sectional view taken along lines 4—4 of FIG. 3.
Figure 5:
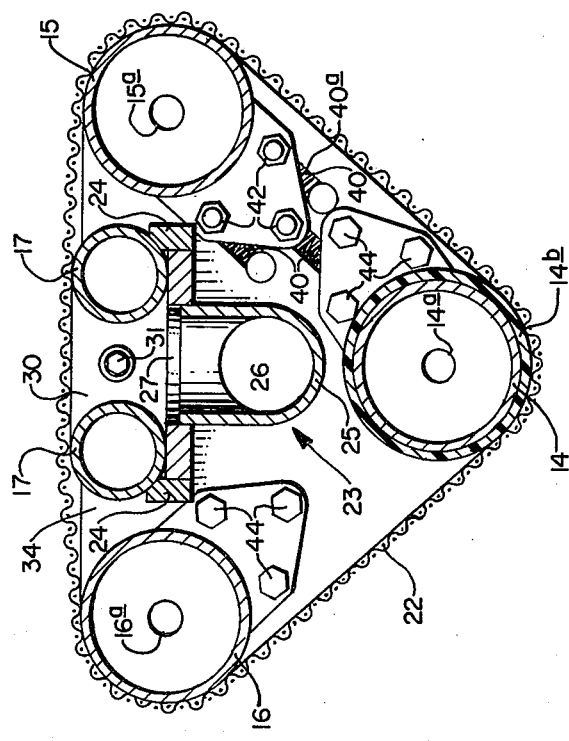
FIG. 5 is a cross-sectional view taken along lines 5—5 of FIG. 3.

FIGS. 3–7 depict in greater detail a preferred embodiment of an apparatus of the present invention for vacuum embossing film. Referring now to FIGS. 3, 4, and 5, the apparatus includes a generally hollow, cylindrical drive roll 14 which drives screen 22 about support rolls 15 and 16 and over seal rolls 17—17. Rolls 14, 15, and 16 can be made from any suitable metal, e.g., steel, aluminum, bronze, etc. Drive roll 14 is preferably covered with a suitable elastomeric covering 14b such as, for example, a neoprene or silicone rubber. As seen in FIG. 4, drive roll 14 is rotatably supported by hollow shaft members 28—28 received in bearings 19—19, which are attached to end plates 34—34. Shaft members 28—28 are connected by hollow nipples 29—29 and lock nuts 42—42 to rotating unions 36—36. One of the unions 36 is connected by a supply conduit (not shown) to a suitable supply of a heating or cooling fluid, e.g., water or oil, and the other union is connected to a discharge conduit (not shown) for returning the fluid to the supply source. Thus a heating or cooling fluid may flow through the hollow interior 14c of drive roll 14, as indicated by the arrows in FIG. 4.

Figure 7:
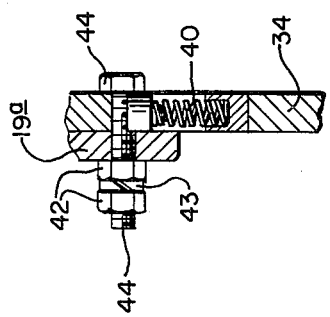
FIG. 7 is a detailed view of a spring tensioning portion of the present invention.
Figure 6:
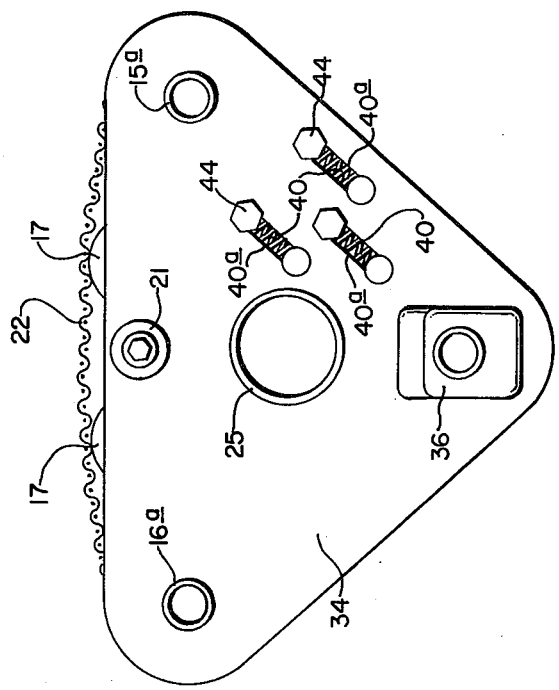
FIG. 6 is an end view of a portion of the apparatus of Figure 3.

Support rolls 15 and 16 are similar in construction to drive roll 14 and are supported by hollow shaft members 15b–15c and 16b–16c, respectively, which are received in bearings 19a–19a and 19b–19b attached to end plates 34–34. Also, support rolls 15 and 16 are hollow inside and are constructed in such a manner that heating or coolant fluids such as oil or water may be forced therethrough in the manner indicated by the arrows in FIG. 3. As can be seen in FIG. 3, support rolls 15 and 16 may be heated or cooled by supplying a fluid through hollow shaft members 15c and 16c at one end and discharging the fluid through hollow shaft members 15b and 16b at the other end. Support roll 15 is biased away from drive roll 14 and support roll 16 by springs 40, as can be seen in FIGS. 5, 6, and 7. The springs 40 are contained within slots 40a in end plate 34. The springs 40 urge bearing assembly 19a outwardly to force support roll 15 to place tension upon screen 22 to force screen 22 snugly against the support rolls 15 and 16 and drive roll 14. As can be seen in detail in FIG. 7, each spring 40 applies force against a bolt 44 which has nuts 42 and washer 43 connected thereto to slideably couple the bearings 19a–19a to the end plates 34–34.

A vacuum assembly, designated generally by the numeral 23 is positioned between support rolls 15 and 16 and directly above drive roll 14 to apply vacuum to a portion of the underside of the top of screen 22. The assembly includes a generally rectangular bottom support plate 18 which extends between end plates 34–34 and is attached thereto by welding or other suitable means. A seal retainer strip 24 is attached by bolts or other suitable means to each side edge of bottom support plate 18 and projects upwardly therefrom. A pair of spaced apart seal rolls 17–17 are slidingly supported by bottom plate 18 and make a sliding seal with retainer strips 24–24. Seal rolls 17–17 are preferably made from Teflon or other suitable plastic materials having a low coefficient of friction. Located between seal rolls 17–17 are deckles 30–30 which in turn are threadably connected to deckle screws 31–31. Deckle screws 31–31 are connected by collars 21–21 to end plates 34–34. By turning deckle screws 31–31, deckles 30–30 can be made to move inwardly and outwardly along the shaft of the screw to adjust for various widths of screen 22. Each deckle 30, as can be seen in FIG. 5, has parallel top and bottom edges which make sliding contact with the underside of screen 22 and support plate 18 respectively. The side edges of each deckle are generally semi-circular in shape and fit flush against seal rolls 17–17 to provide a sliding vacuum seal therebetween. Located immediately below bottom support plate 18 is vacuum manifold pipe 25 which projects through end plates 34–34 and is attached thereto by welding or other suitable means. As can be seen in FIG. 4, manifold pipe 25 is connected to openings 27–27 in support plate 18 by inlet conduits 26–26 through which air flows in the direction indicated by the arrows when a vacuum is applied to manifold pipe 25. Vacuum is thus applied to the underside of screen 22 which overlies the vacuum chamber 50 defined by seal rolls 17–17, deckles 30–30 and bottom support plate 18. When heated film 11 is carried by screen 22 over seal rolls 17–17, the vacuum or low pressure existing in chamber 50 pulls the heated film 11 tightly against screen 22 to emboss the film.

To carry out the process of the present invention a sheet of heated thermoplastic film 11 is applied to the top surface of screen 22 lying between support rollers 15 and 16. Screen 22 is rotated by drive roll 14 thereby pulling film 11 over vacuum chamber 50. Vacuum is applied to each end of the vacuum manifold pipe 25 and thus creates a vacuum within the chamber 50 pulling the heated film into firm embossing contact with the upper surface of the embossing screen 22 to thereby transfer the pattern of the embossing screen to the heated film 11. The heated film 11, after passing over the vacuum space 50 is carried by screen 22 and around chill roll 13 where the embossed film is rapidly cooled to set the pattern of the film and then the cooled film is removed and wound on a storage roll or other suitable storage means (not shown). The heated film 11 may be supplied by any of the means described hereinbefore, i.e., by extrusion from a slot die mounted directly above the embossing apparatus or by passing the film through a heated air oven, or by heating the film by noncontacting or contacting means, i.e., infrared heaters or heated rollers. The film, after passing over vacuum chamber 50 may also be cooled by circulating a cooling medium, e.g., refrigerated water, through hollow support roll 15. Optionally, the embossed film may also be cooled by applying cold air to the top surface of the film after it passes over the vacuum chamber. Additionally, the heated film 11 may be further heated before being applied to the screen 22 by circulating a heating medium, e.g., hot oil, through a lag or lay-on roll 13, as seen in FIGS. 1 and 2. Screen 22 may be preheated to enchance embossing of heated film 11 by circulating a heating medium through hollow drive roll 14. Also, an auxiliary heater roll (not shown) may be positioned between drive roll 14 and support roll 15 in rolling contact with screen 22 to add heat to the screen 22.

Suitable thermoplastic materials may be embossed by the process of the present invention, i.e., thin webs of from 0.25 mils up to as thick as 10 mils. Exemplary thermoplastic materials uitable for vacuum forming according to the present invention are polyethylene and polyethylene copolymers, e.g., polyethylene-polypropylene copolymers; polyvinyl chloride polymers and copolymers, e.g., polyvinyl chloride-polyvinyl acetate copolymers; polypropylene homopolymers and copolymers; Saran films; Mylar films; polystyrene films, and others.

Embossed film was produced utilizing the process and apparatus of the present invention. A polyethylene resin, No. 5561, manufactured by Gulf Oil Corporation was extruded on a Davis-Standard extruder with 2½ inch screw into an Egan slot die having a die gap of 0.025 inch and a width of approximately 16 inches. The support and drive rolls carried an electroformed, endless, seamless, nickel, embossing screen having hexagonal openings. The screen had 28 openings per linear inch (784 openings/square inch). The screen was cooled by blowing refrigerated air on it and contacting the screen with the water-cooled drive and support rolls. Two inches of mercury vacuum was applied to the underside of the seamless embossing screen using a rotating vane vacuum pump driven by a 7½ horsepower motor. The vacuum embossed film was rolled up, and samples were tested for physical properties.

Samples of the embossed film were found to have the following typical physical properties:

| Tensile Strength | | |
|---|---|---|
| Machine Direction | 3,000 | psi |
| Transverse Direction | 1,600 | psi |
| Elongation | | |
| Machine Direction | 275 | percent |
| Transverse Direction | 400 | percent |
| Modulus at 1% | | |
| Machine Direction | 15,000 | psi |
| Transverse Direction | 12,000 | psi |
| Impact (26 in Dart Drop) | 90 | grams |
| Stress at 25% | 600 | grams |
| Coefficient of Friction | 1.0 | |
| Gloss at 45 degrees | 9 | |
| Embossed Thickness | 3.5 | mils |
| Unembossed Thickness | 0.9 | mil |
| Density | 0.96 | g/cc |

While the use of refrigerated air and water contact have been described as one form of cooling the embossing roll or screen, it is understood that other forms may be used, i.e., internal fluid cooling may be utilized by providing suitable conduits and passages on the inside of the embossing roll. Also, conduits and passages can be provided in both the drive roll 14, support rolls 15 and 16, and chill roll 13 to remove heat from the embossing screen 22.

The physical properties of the samples of embossed film set forth hereinbefore utilized the following test methods: Tensile Strength, ASTM D882-67, Method A; Elongation, ASTM D882-67, Method A; Modulus at 1%, ASTM D882-67, Method A; Impact Strength, Drop Dart using ASTM D1709-67; Density, ASTM D1505-68; Gloss, ASTM D457-65T; Coefficient of Friction, ASTM D1894-63; and Stress (= Tensile at 25% elongation), ASTM D882-67, Method A.

The foregoing embodiments are exemplary of the process and apparatus for carrying out the present invention; however, many variations of the invention may be made without departing from the spirit and scope of the invention.

What is claimed is:

1. In an apparatus for applying vacuum to a moving web of material, the combination comprising:
   a. a pair of spaced apart end support brackets;
   b. a pair of spaced apart, hollow support rolls rotatably mounted on said support brackets;
   c. a drive roll located in a position intermediate and to one side of said pair of support rolls and rotatably mounted on said support brackets;
   d. an endless, seamless, flexible, porous screen mounted on said pair of support rolls and said drive roll for rotation therewith; and
   e. a vacuum assembly mounted on said end brackets and positioned between said pair of support rolls, said vacuum assembly including,
      i. a bottom support plate having each of its ends fixedly attached to said end brackets, said plate having at least one opening therein,
      ii. a vacuum conduit connected to said opening in said plate,
      iii. a pair of spaced apart, cylindrical seal tubes rotatably supported by said bottom support plate, each of said seal tubes rotatably contacting the underside of said screen,
      iv. a seal retainer strip mounted on each edge of said bottom support plate and entending outwardly therefrom and making sealing contact with the one of said pair of seal tubes lying adjacent the respective edge of said bottom support plate,
      v. a movably mounted deckle member adjacent each end of said seal tubes, said deckle member making sliding, sealing contact with said bottom support plate, both of said seal tubes and the underside of said screen to provide a vacuum chamber underlying that portion of said screen lying between the lines of contact made on the underside of said screen by said seal tubes.

2. In the apparatus of claim 1 wherein mounting means are provided on at least one of said pair of support rolls resiliently coupling said one of said support rolls to said pair of end support brackets whereby continuous tension is applied to said screen.

3. In the apparatus of claim 2 wherein said drive roll is provided with a resilient covering on its outer cylindrical surface.

4. In the apparatus of claim 1 including means for circulating a fluid medium through at least one of said pair of support rolls.

5. In the apparatus of claim 1 including means for circulating a fluid medium through said drive roll.

6. In the apparatus of claim 1 including means for cooling said screen.

7. In the apparatus of claim 1 wherein said pair of cylindrical seal tubes and said seal retainer strip are constructed from a fluorine-containing polymeric material.

* * * * *